United States Patent [19]

Yamaguchi et al.

[11] Patent Number: 4,510,103
[45] Date of Patent: Apr. 9, 1985

[54] METHOD OF MOLDING A COMPOSITE BODY INVOLVING A THERMOSETTING RESIN

[75] Inventors: Yasuhiro Yamaguchi; Yoshiaki Sakatani, both of Nagoya, Japan

[73] Assignee: Agency of Industrial Science and Technology, Tokyo, Japan

[21] Appl. No.: 533,502

[22] Filed: Sep. 19, 1983

[30] Foreign Application Priority Data

Sep. 28, 1982 [JP] Japan .................................. 57-167658

[51] Int. Cl.³ .......................... B29C 11/00; B29G 7/00
[52] U.S. Cl. .................................. 264/40.2; 264/40.5; 264/239; 264/331.11
[58] Field of Search .................. 264/26, 40.1, 40.2, 264/40.6, 40.5, 331.11, 239

[56] References Cited

U.S. PATENT DOCUMENTS

| 3,914,357 | 10/1975 | Cereijo et al. | 264/40.2 |
| 3,920,367 | 11/1975 | Ma et al. | 425/149 |
| 3,941,534 | 3/1976 | Hunkar | 425/149 |
| 4,191,718 | 3/1980 | Mallick et al. | 264/26 |
| 4,257,991 | 3/1981 | Kirjavainen | 264/40.2 |
| 4,387,336 | 6/1983 | Joy et al. | 264/40.2 |

OTHER PUBLICATIONS

SAMPE (1978) JICST No. C81093587, 12th National SAMPE Technical Conference, Oct. 7-9, 1980, pp. 637-647.
SAMPE, vol. 21, (1976), pp. 783-802.

Primary Examiner—Willard E. Hoag
Attorney, Agent, or Firm—Frishauf, Holtz, Goodman & Woodward

[57] ABSTRACT

A method of molding a composite material containing a thermosetting resin by determining an optimum pressure-initiating time from abrupt variations in the electric capacity and/or dielectric loss coefficient of the molded material caused by the application of heat to the composite material.

5 Claims, 4 Drawing Figures

F I G. 1
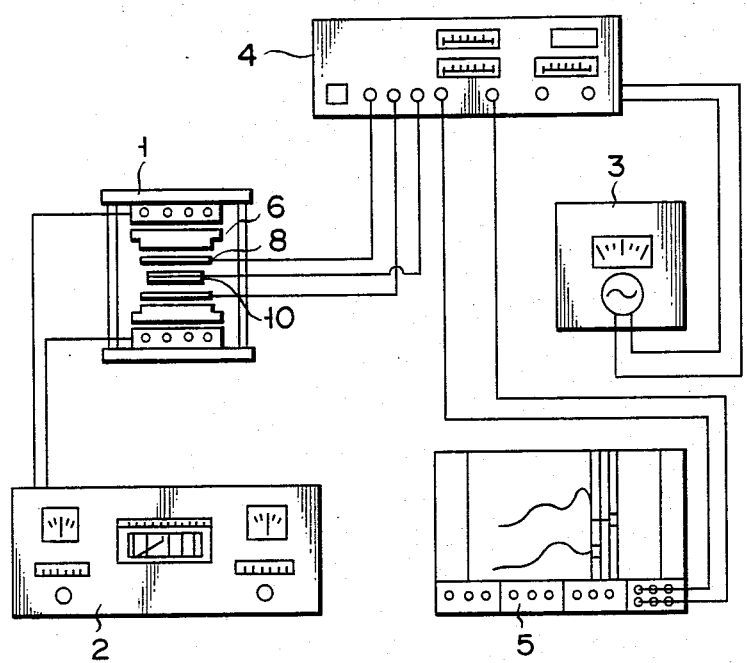
F I G. 2
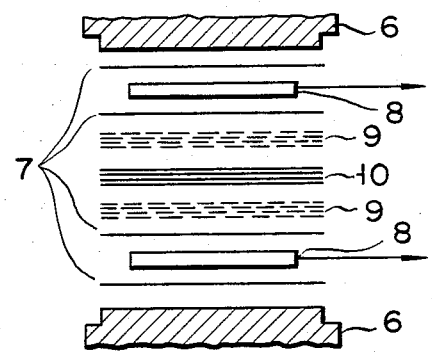

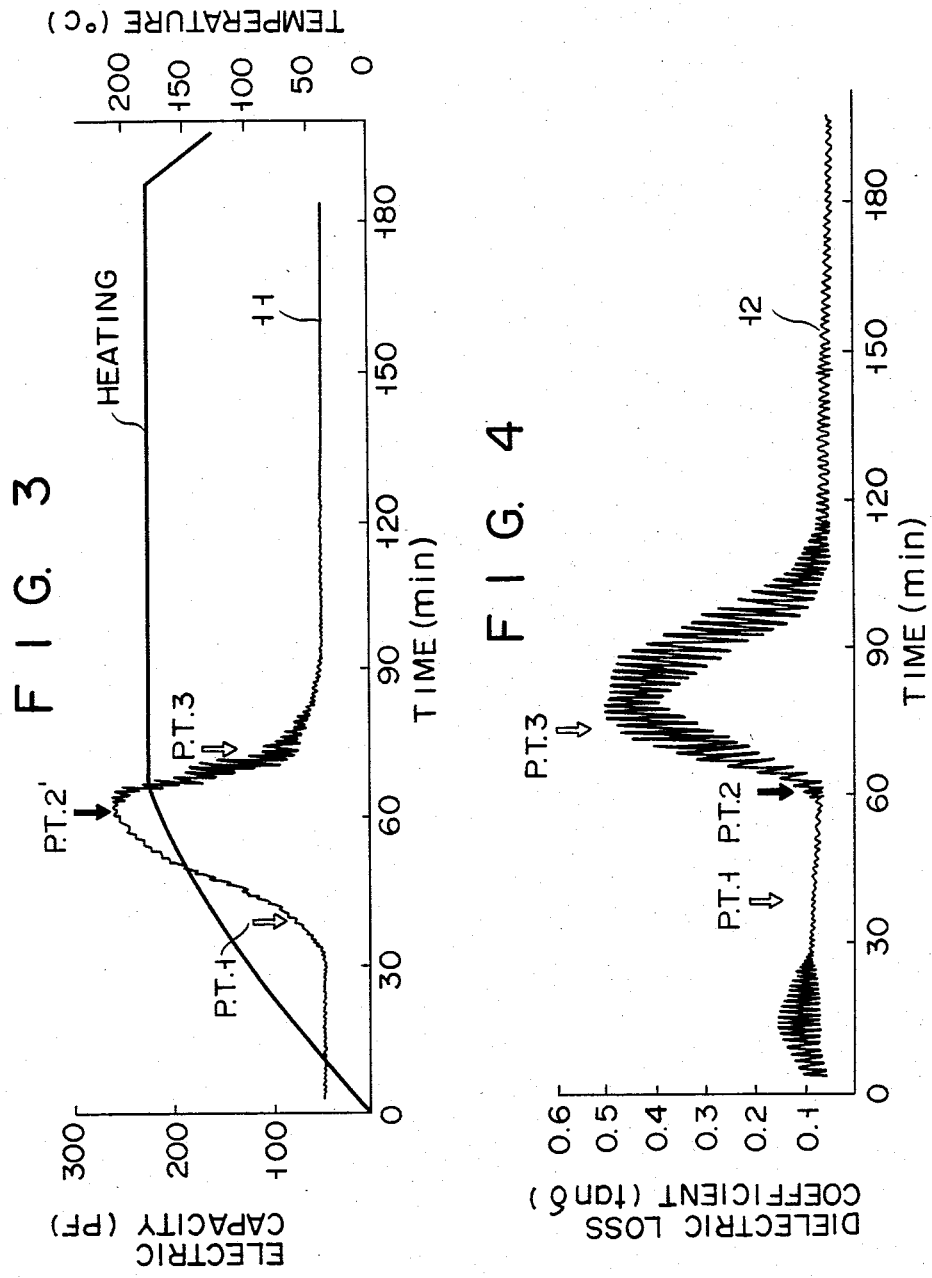

METHOD OF MOLDING A COMPOSITE BODY INVOLVING A THERMOSETTING RESIN

BACKGROUND OF THE INVENTION (a) Field of the Invention

This invention relates to a method of molding a composite body involving a thermosetting resin which is used in space instruments, automobiles, general manufacturing machines, electric and electronic appliances and sports/leisure articles.

(b) Description of the Prior Art

When a composite body involving a thermosetting resin reinforced with inorganic fiber is molded, the conventional process comprises monitoring the temperature of the composite body during molding to control the hardening of the matrix resin constituting one of the molded materials. However, the above-mentioned composite body-manufacturing process has the drawback that since it is impossible to directly ascertain the hardening behavior of a resin during molding, a high quality structure with a complicated outline cannot be manufactured continuously.

SUMMARY OF THE INVENTION

It is accordingly the object of this invention to provide a method of molding a composite body involving a thermosetting resin which is free of the drawbacks of the conventional manufacturing process and enables even a structure with a complicated outline to be manufactured with a high quality using integral molding.

As used herein, a composite body involving (i.e. comprising) a thermosetting resin is defined as an article manufactured by mixing a thermosetting resin, such as unsaturated polyester, epoxy resin, or phenolic resin with a known reinforcing organic or inorganic filler, for example, glass fiber, carbon fiber or asbestos.

This invention has been accomplished with the discovery that a structure with a complicated outline can be integrally molded with high quality by the steps of monitoring the hardening behavior during molding; determining an optimum molding method by detecting the successive hardening stages of the composite body in the form of variations in the electric capacity an/or the coefficient of dielectric loss of the molded materials; and accurately defining an optimum pressure-starting time from a point at which the dielectric property suddenly (i.e. abruptly) changes.

To attain the above-mentioned object, this invention provides a method of molding a composite body involving a thermosetting resin, said method being characterized by heating the molded materials with a prescribed temperature pattern, detecting an optimum pressure-starting time from variations caused by heating in the electric capacity and/or the coefficient of dielectric loss of the molded materials and applying the prescribed pressure to the molded materials beginning at said optimum pressure-starting time.

BRIEF DESCRIPTION OF THE DRAWINGS

FIG. 1 shows a typical monitoring device provided with a mechanism for detecting the electric capacity and coefficient of dielectric loss of the molded materials as used in this invention;

FIG. 2 is a fractional exploded view of a hot press, illustrating the method of measuring the dielectric property of the molded mass;

FIG. 3 is a curve diagram indicating an instance of measuring the electric capacity of the molded mass; and FIG. 4 is a curve diagram showing an instance of measuring the coefficient of the dielectric loss of the molded mass.

DETAILED DESCRIPTION OF THE PREFERRED EMBODIMENTS

Description will now be given with reference to the accompanying drawings of a method embodying this invention for molding a composite body involving a thermosetting resin.

A monitoring device shown in FIG. 1 comprises a hot press 1, temperature controller 2, constant voltage adjuster 3, dielectric property detector 4 and recorder 5. The molded mass 10 consists of a plurality of laminated preimpregnation sheets as shown in FIG. 2. The top and bottom planer of the molded mass 10 are covered with a glass cloth 9. The laminated mass is inserted between a pair of aluminium electrode plates 8. The whole assembly is set between a pair of metal molds 6. The paired aluminium electrode plates 8 are applied in a state enclosed in an insulation sheet. The glass cloth 9 is used to protect the paired aluminium electrode plates 8 and to absorb the excess molten resin leaking during the molding of the above-mentioned laminated mass 10.

The paired metal molds 6 containing the above-mentioned assembled mass are set in the hot press 1. The assembled mass in heated by the temperature controller 2. An output electric signal from the dielectric property detector 4 is stored in the recorder 5. At this time, the behavior of the dielectric property corresponding to the successive hardening stages of the resin (as indicated by the electric capacity curve of FIG. 3 and the dielectric loss coefficient curve 12 of FIG. 4) is used to determine the optimum point of time at which the application of pressure should be started. It has been experimentally discovered that the above-mentioned optimum pressure-starting time corresponds to the abrupt change point of time PT2 (given in the dielectric loss coefficient curve 12) at which the second peak begins to rise, namely, the point of time at which the electric capacity curve 11 suddenly rises and immediately afterwards begins to fall (that portion of the curve which is denoted by PT2'). The points of time PT2, PT2' have been found to represent a pressure-starting time without being affected by the composition of a composite body involving a thermosetting resin, and substantially coincide with each other. Therefore, the optimum pressure-starting time may be judged from the determination of the dielectric property shown in either FIG. 3 or FIG. 4.

Table 1 below shows the results of comparative experiments conducted by changing the pressure-starting time as PT1, PT2, PT3. In the comparative experiments, samples of a composite body consisting of carbon fiber and epoxy resin were tested. While the temperature was raised to 180° C. in increments of 25° C./min, a molding pressure of 7 kg/cm$^2$ was applied to the samples when they began to be pressurized. The samples were molded by being hardended for 2 hours at 180° C. with the above-mentioned pressure maintained. Table 1 below indicates the quality of the respective samples of molded plates.

TABLE 1

| No. of molded plate | Pressure starting time (temperature °C.) | Thickness* of molded prepreg sheet (mm) | Density $10^3$ kg/m$^3$ | Percentage** content of fiber (%) | Voidage (%) | Aspect of observed cross section |
|---|---|---|---|---|---|---|
| 1 | PT1 (120) | 0.105 | 1.62 | 70 | 1.0 | Voids occurred between the preimpregnated layers in the direction in which the fibers were stretched |
| 2 | PT2 (165) | 0.127 | 1.62 | 63 | 0 | Uniform structure free from voids, resin-rich sections and fiber-rich sections |
| 3 | PT3 (180) | 0.146 | 1.50 | 62 | 5.4 | Noticeable continuous voids appeared between the preimpregnated layers in the direction in which the fibers were stretched |

Notes:
*The optimum thickness of a molded preimpregnated sheet is preferred to be 0.120 to 0.140 (mm).
**The percentage content of fiber in a molded plate is preferred to be 60 to 70%.

Table 1 above shows that when all the factors such as the thickness of molded pregreg sheet, density, fiber content and voidage of a molded plate were taken into account, the pressure-starting time PT2 (or PT2') is more preferable to the pressure starting time PT1 or PT3.

In the foregoing examples, the hot press was used as a means for molding a composite body involving a thermo-setting resin by applying heat and pressure. However, the composite body may be produced by another process of applying heat and pressure to the whole of molded materials and metal die enclosed in a bag by means of an autoclave, or carrying out the molding in a vacuum.

The above-mentioned embodiment referred to the case where the dielectric property of the molded composite body was monitored by an electrode mounted on the top and bottom of the molded materials. Where, however, it is intended to produce a molded article having a complicated outline, it is possible to provide an electrode in many required places, and start the application of pressure at different points of time according to the various sections of said molded article.

As described above, the method of this invention for molding a composite body involving a thermosetting resin has the advantages that unlike the conventional composite body-molding process based on the monitoring of the temperature of a resin component to be molded, the hardening behavior of the resin component can be directly determined during the molding process, thereby enabling the optimum hardening condition of the resin component to be easily selected, and consequently assuring the manufacture of a composite body having a complicated outline with high quality.

What is claimed is:

1. A method for forming a molded body from a material including at least a thermosetting resin, comprising:
   disposing said material in a mold;
   heating said material in a desired time-temperature sequence;
   monitoring at least one of the capacitance and dielectric loss coefficient of said material while heating said material until an abrupt change occurs in at least said one of said capacitance and said dielectric loss coefficient;
   determining an optimum pressure-starting time from said abrupt change; and
   applying pressure to said material in said mold beginning substantially at said optimum pressure starting time.

2. The method of claim 1, wherein said optimum pressure-starting time is the time at which a maximum occurs in the capacitance of said material after said heating begins.

3. The method of claim 1, wherein said optimum starting time is the time at which a second peak begins to rise in the dielectric loss coefficient of said material after said heating of said material begins.

4. The method of claim 1, wherein said optimum pressure starting time is the time at which an abrupt change in both said capacitance and dielectric loss coefficient of said material occurs after said heating of said material begins.

5. The method of claim 1, wherein said material includes a reinforcing material disposed in said mold with said thermosetting resin; and the optimum-pressure starting time is the time at which a change occurs in the capacitance or dielectric coefficient of the combined resin and reinforcing material.

* * * * *